United States Patent [19]

Coughlin

[11] 3,908,691
[45] Sept. 30, 1975

[54] BUTTERFLY VALVE MAIN-TAPPING APPARATUS

[76] Inventor: Donald W. Coughlin, P.O. Box 535, Lake Arrowhead, Calif. 92352

[22] Filed: Sept. 19, 1974

[21] Appl. No.: 507,405

[52] U.S. Cl. ............................................... 137/315
[51] Int. Cl.² ........................................... F16L 55/18
[58] Field of Search ............ 137/315, 326, 327, 15; 29/157.1 R, 213, 401; 251/291, 305, 308

[56] References Cited
UNITED STATES PATENTS

| 587,108 | 7/1897 | Sherrerd | 137/315 |
| 955,334 | 4/1910 | Hoefer | 137/315 |
| 1,052,536 | 2/1913 | Walsh | 137/315 |

Primary Examiner—Martin P. Schwadron
Assistant Examiner—Robert J. Miller
Attorney, Agent, or Firm—Dana E. Keech

[57] ABSTRACT

The disclosed apparatus includes a butterfly valve, the body of which has co-axial in-flow and out-flow tubes, flanged at their outer ends and integral with a central box forming a transversely disposed slot-like wedge shaped chamber open at one side of said box for snugly, slidably receiving an annular wedge shaped wafer in the middle of which a butterfly disc is diametrally, pivotally mounted on trunnions journalling in said wafer on an axis aligned with the side opening of said box. The latter opening is normally covered with a plate. Mounted on the opposite side of the valve body box is a gear type valve disc operator which makes splined connection with the adjacent disc trunnion.

A flanged neck radiating from said annular wafer terminates just within said box side closing plate and has a hex shaped recess surrounding a squared end formed on the disc trunnion which journals in said neck.

8 Claims, 12 Drawing Figures

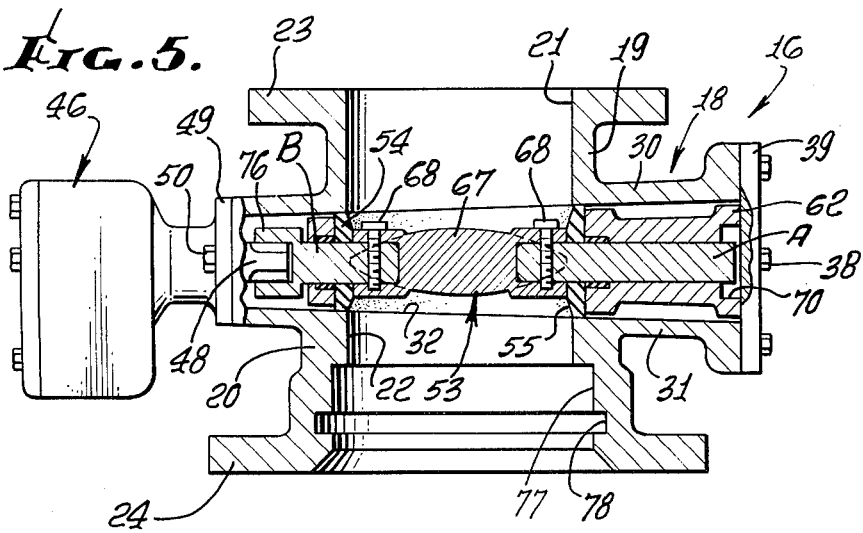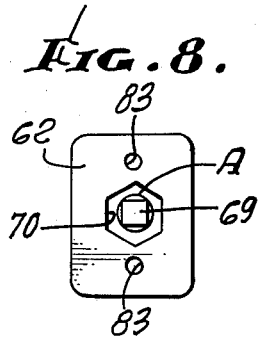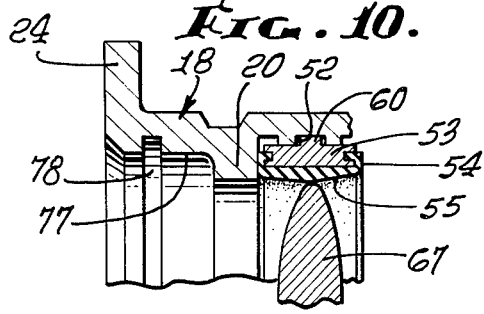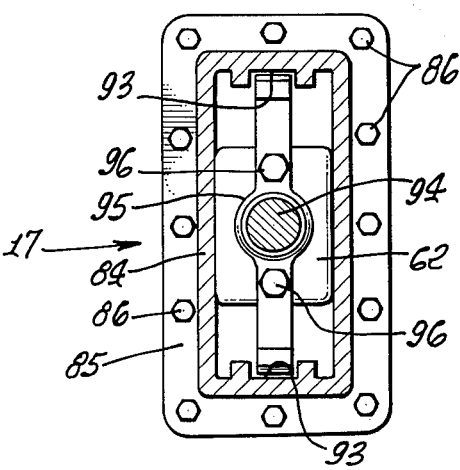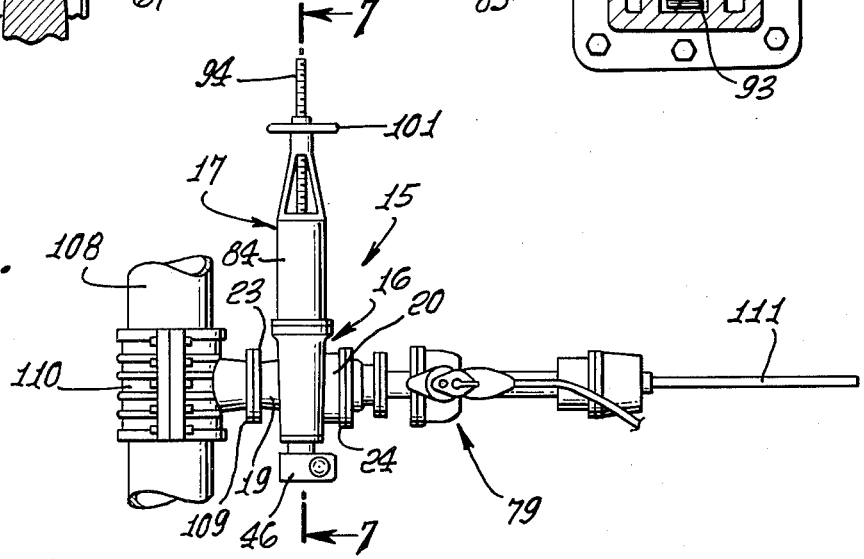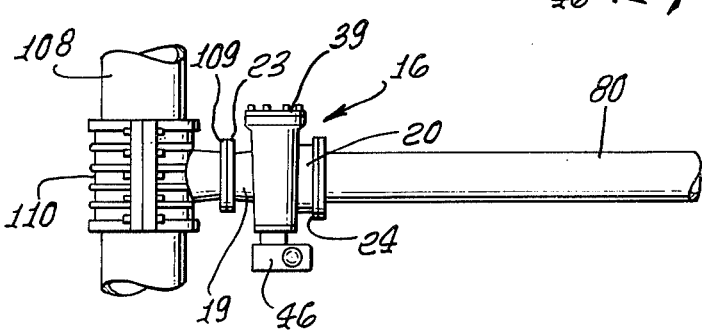

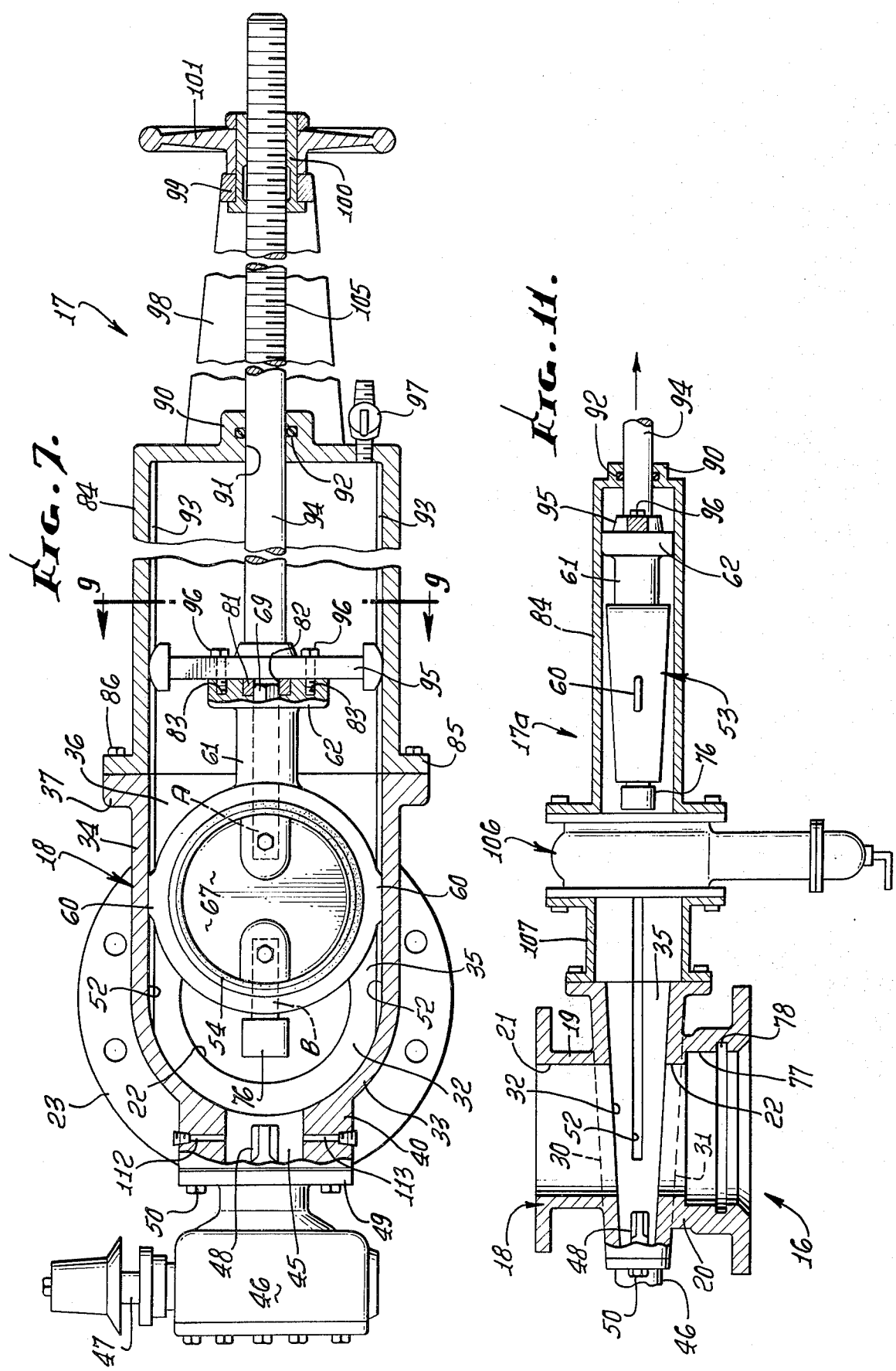

BUTTERFLY VALVE MAIN-TAPPING APPARATUS

SUMMARY OF THE INVENTION

The present invention is particularly directed to the provision of an improved butterfly valve for use in installing and subsequently controlling the flow through, lateral pipe lines drawing water from water mains.

An important object of the invention is to provide a butterfly valve which can be connected at one end directly to a tapping tee clamped on a water main and at the other end with a core cutting tapping machine and in which the butterfly disc mounting wafer may be retracted out of the bore of the valve, while the valve remains water tight, thereby permitting the cutter of said machine to be advanced through the bore of the valve to tap the water main and then be retracted back into said machine whereby said disc mounting wafer may be reinserted into place in the valve, in bore closing position, and the tapping machine may be replaced by a lateral pipe line which will thus constitute a service connection through the valve with said water main.

Another object of the invention is to provide such a butterfly valve which is relatively small and compact, when finally installed, and which employs an accessory unit for effecting a water tight retraction of the valve disc mounting wafer and then the restoration of said wafer in the valve incidental to the tapping of a water main under pressure, which accessory unit is then dispensed with pending a periodical need therefor in the servicing of said valve.

Yet another object of the invention is to provide such a valve in which the pivotal rotation of the butterfly disc on a diametral axis is accomplished by a splined operator connection with one of two co-axial trunnions on which said disc is mounted and which journal at diametrically opposite points on said annular wafer.

A still further object is to provide such a valve wherein said splined connection with a reduction gearing operator, the latter being fastened to the body of said valve on the opposite side thereof from the open side of the wafer receiving chamber, whereby said splined connection is effective automatically upon said wafer being inserted into said valve.

BRIEF DESCRIPTION OF THE DRAWINGS

FIG. 5 is a cross sectional view taken on the line 5—5 of FIG. 4.

FIG. 6 is an assembly view at a reduced scale of the apparatus of the invention as assembled to perform a water main tapping operation.

FIG. 7 is an enlarged cross sectional view taken on the line 7—7 of FIG. 6 and illustrating the wafer withdrawal accessory of the valve of the invention and illustrating said withdrawal partially performed.

FIG. 8 is a detail end view of the wafer neck flange of the invention and is taken on the line 8—8 of FIG. 4.

FIG. 9 is a fragmentary cross sectional detailed view taken on the line 9—9 of FIG. 7.

FIG. 10 is an enlarged fragmentary detailed sectional view taken on the line 10—10 of FIG. 4.

FIG. 11 is a modified form of accessory device and illustrating the apparatus of the invention assembled for servicing the wafer of the valve without interrupting the water service through said valve, and wherein said apparatus includes a slide gate through which the wafer may be withdrawn after which the slide gate is shut off to close the side opening of the wafer chamber in the valve while the wafer is being repaired.

FIG. 12 is a view similar to FIG. 6 showing the installation of a lateral pipe line after the valve accessories are removed following a water main tapping operation.

DETAILED DESCRIPTION OF THE PREFERRED EMBODIMENT

Figure 1:
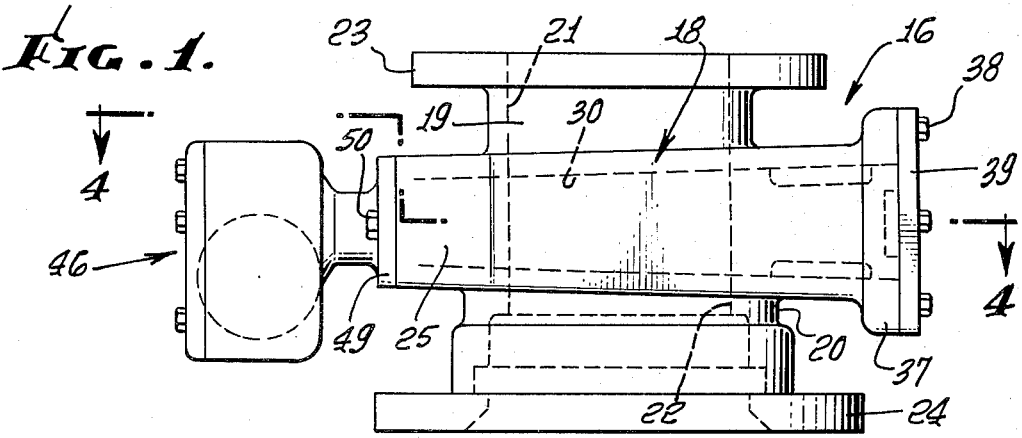
FIG. 1 is a bottom plan view of a preferred embodiment of the valve of the invention.
Figure 3:
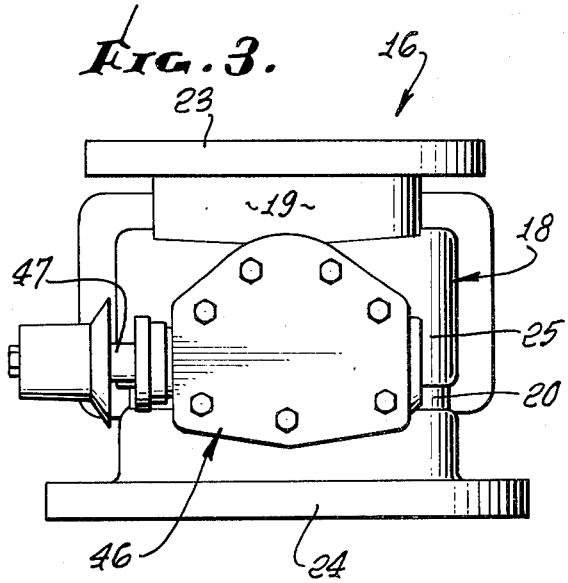
FIG. 3 is a left side elevational view of FIG. 1.
Figure 2:
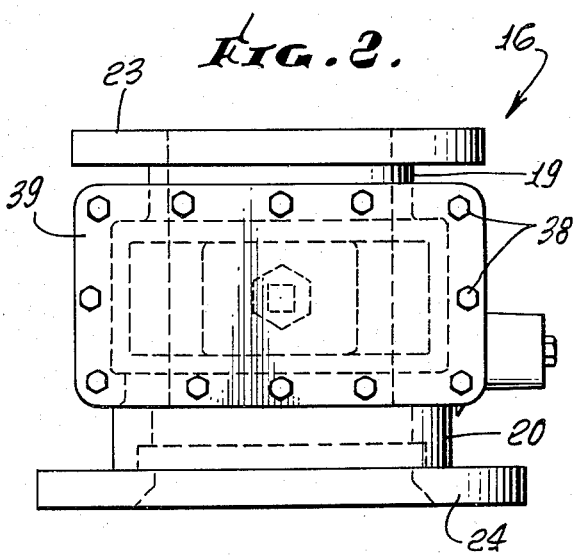
FIG. 2 is a right side elevational view of FIG. 1.

The preferred form of the invention disclosed herein, constitutes a butterfly valve main-tapping apparatus 15. This apparatus embraces a butterfly valve 16 which it is the principal function of the invention to install in a pipe line connected to a water main whereby said valve will serve as the permanent shut-off valve or said pipe line, and an accessory device 17 which is incorporated with said butterfly valve (1) to facilitate a water main tapping operation conducted through said valve of (2) to facilitate the removal of the core wafer of said valve for servicing the latter, without either of these operations necessitating a shut down of the water main involved or of the lateral connecting pipe line in which said butterfly valve is installed.

BUTTERFLY VALVE 16

This valve includes a body 18 which is preferably an integral casting of a suitable metal which incorporates short in-flow and out-flow tubes 19 and 20 having co-axial bores 21 and 22 and which have connection flanges 23 and 24 at their outer ends. The body 18 also incorporates a transversely disposed central box 25 including flat end walls 30 and 31 which converge inwardly towards each other to provide a wedge shaped chamber 32 which intercepts bores 21 and 22 so that said bores communicate co-axially with said chamber. The shape of chamber 32 is determined by said end walls 30 and 31, and by a semi-circular peripheral wall 33 and two parallel peripheral wall 34 which merge tangentially with the opposite ends of semi-circular walls 33 and combine with end walls 30 and 31 to provide a throat 35 which extends radially from said chamber to a side opening 36 which lies in a plane normal to parallel walls 34. The box 25 is provided with a continuous flange 37 surrounding side opening 36 which flange is provided with suitable tapped holes for receiving cap screws 38 for securing a plate 39 to box 25 to form a water tight closure for side opening 36.

Formed on the box 25 integrally with semi-circular wall 33 and co-axially with throat 35 is a boss 40, said boss having a cylindrical axial recess 45 which communicates with chamber 32. A reduction geared manual valve operator 46 has an input shaft 47 and a splined output shaft 48, the latter being surrounded by a flange 49 which is secured to boss 40 by cap screws 50 to locate output shaft 48 co-axially within recess 45.

Inside faces of parallel box walls 34 are provided with guide grooves 52, the purpose of which will be made clear hereinafter. Slideable through the throat 35 into chamber 32 when the closure plate 39 is removed, is an annular valve core wafer 53. This wafer is wedge shaped so as to loosely fit within chamber 32 but is lined with a rubber or rubber-like annular packing ring 54 which tightly adheres to the wafer to form a snug seal between the wafer 53 and the areas of the chamber 32 adjacent the inflow and outflow tube bores 21 and 22 so as to form a water tight connection between said bores and the axial hole 55 in the packing ring 54 which forms the resilient valve seat of the valve 16.

Figure 4:
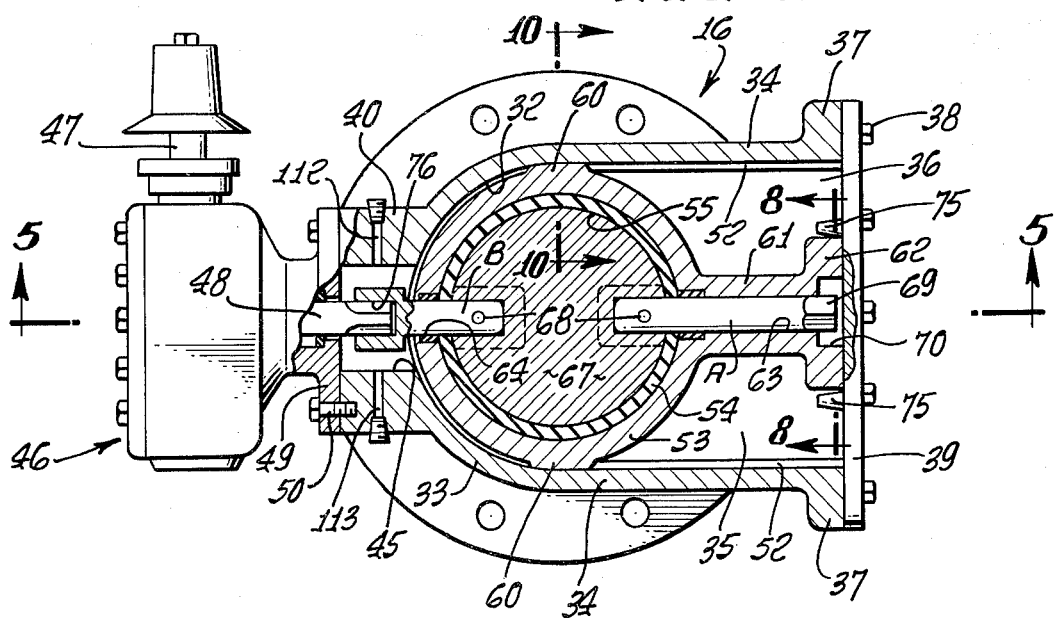
FIG. 4 is a cross sectional view taken on the line 4—4 of FIG. 1.

Formed diametrically at opposite points on annular wafer 53 are shallow lugs 60 which extend into and are guided by guide grooves 52. Also formed on wafer 53 is a neck 61 having a flanged head 62 on its outer end, the latter preferably lying just within and flat against the inner face of flat closure plate 39 as shown in FIGS. 4 and 5. Formed diametrically in the wafer 53 and co-axially with neck 61 are holes 63 and 64 in which trunnions A and B pivotally journal. Mounted on inner portions of said trunnions in co-axial relation with valve seat hole 55 is a metal valve disc 67 which is secured to said trunnions by pins 68 for the purpose of controlling through said trunnions the rotation of said disc about the axis of said trunnions.

Trunnion A has a squared outer end 69 which is surrounded by a hex shaped recess 70 formed in the upper face of flanged head 62.

As clearly shown in FIGS. 4 and 5, the flanged head 62 on wafer neck 61 is snugly confined within the chamber throat 35 by closure plate 39 and makes a close fit with the flat end walls 30 and 31 of box 25 just inside of said closure plate. Lugs 75 extend inward from the closure plate 39 to engage opposite ends of flanged head 62.

Provided on the outer end of trunnion B is a spline socket 76 into which the splined output shaft 48 of operator 46 fits whereby manual actuation of said operator will provide rotational control of the valve disc 67 within the circular valve seat hole 55 of the valve wafer 53.

The outflow tube 20 has a counter bore 77 in which is formed an O-ring recess 78 for the purpose of making a sealing connection between outflow tube 20 of the valve body and a tapping machine 79 (see FIG. 6) or a lateral service pipe 80 (see FIG. 12).

A hexagonal key 81 is provided which fits into the hex shaped recess of the flanged head 62, said key having a square axial hole 82 fitting the squared end 69 of trunnion A. Said flanged head 62 is also provided with a pair of tapped holes 83 (see FIG. 8).

ACCESSORY DEVICE 17

In addition to the butterfly valve 16, the apparatus 15 of the invention embraces an accessory device 17 which is illustrated in FIGS. 6 and 7 while associated with the butterfly valve 16 for performing a water main-tapping operation and in FIG. 11 as when withdrawing valve core wafer 53 from the valve 16 for inspection or repair, both of these operations being facilitated by said accessory device in a manner so as not to interrupt the water service flowing through said water main or through the valve 16.

In the first of the aforesaid operations, the accessory device 17, as shown in FIGS. 6 and 7 comprises a water tight barrel 84 which constitutes an extension of the valve chamber throat 35 having the same cross section as said throat and having an endless flange 85 which matches endless flange 37 and is secured thereto by cap screws 86, after the closure plate 39 has been removed from the valve body 18.

The outer end of barrel 84 terminates in a head 90 which is centrally penetrated by a bore 91 in which is recessed a sealing O-ring 92. The barrel 84 has guide grooves 93 which constitute extensions of the guide grooves 52 formed in the throat 35 of chamber 32. Fixed to the inner end of a shaft 94 which makes a sealed sliding fit with O-ring 92 is a guide head 95 opposite ends of which are slidingly received in guide grooves 93 and which is provided with a pair of cap screws 96 which are screwed into the tapped holes 83 in the flanged head 62 of the wafer neck 61 as clearly shown in FIGS. 7 and 9 so as to co-axially connect the shaft 94 with said wafer neck. The barrel 84 is provided with a petcock 97 and has yoke 98 fixed thereto having mounted thereon at its apex, a sleeve 99 in which a flanged nut 100 is rotatable, said nut having fixed thereto a hand wheel 101. A substantial portion of the shaft 94 has threads 105 on which the flanged nut 100 screws so that rotation of the hand wheel 101 may be employed as a means for withdrawing the valve wafer 53 from valve chamber 32 or returning said wafer to said chamber as shown in FIG. 7.

In FIG. 11 a modified form of accessory device 17a is shown as associated with the butterfly valve 16 of the invention. The accessory device 17a is identical with the accessory device 17 excepting that it has interposed between the water tight barrel 84 and the valve body 18 a slide gate 106 and an adapter coupling 107. In the accessory device 17a, a series of adapter couplings 107 of various sizes are provided so that the accessory device 17a may be fitted to butterfly valves 16 differing in size in performing the operation illustrated in FIG. 11. As previously noted, this operation has to do with drawing the wafer 53 from the valve 16 without interrupting the wafer service through said valve and for the purpose of inspecting said wafer and possibly repairing the same or even replacing said wafer with a new wafer. This operation is facilitated by incorporating in the accessory device 17a the slide gate 106 which is open while the accessory device 17a is operated to withdraw the wafer 53 from the valve until this wafer passes entirely through the slide gate 106 and into the water tight barrel 84 of the accessory device as shown in FIG. 11.

The slide gate 106 is thereupon closed after which the barrel 84 is removed from the slide gate 106 and the valve wafer thus made available for examination, repair or replacement. With the repaired wafer or a substitute wafer 53 mounted on the guide head 95 of the device, the accessory device 17a is now reassembled with petcock 97 closed and the slide gate 106 opened, following which the hand wheel 101 is rotated to return the wafer 53 back into its operative position in the butterfly valve 16. At all times while the wafer 53 is thus being removed from the valve 16 or returned thereto, the hexagonal nut 81 is disposed in the hexagonal recess 70 formed in the flanged head 62 of the wafer neck 61 so as to maintain the valve disc 67 in co-planar relation with the wafer 53 so as to facilitate the removal of the wafer 53 from the chamber 32 and the return of said wafer to said chamber.

In each instance, that is, whether employing the accessory device 17 or the accessory device 17a in association with the butterfly valve 16 as above described and after the wafer has been returned into said valve, the accessory device is disconnected from the valve and separated therefrom only by that distance necessary to insert a wrench between the accessory device and endless flange 37 of the valve body so as to unscrew the cap screws 96 securing the accessory device guide head 95 to flanged head 62 of the wafer neck after which the accessory device may be entirely separated from the valve. This having been accomplished, the hexagonal key 81 is manually removed from the hexagonal recess 70 in the wafer head 62, because it is no longer required to lock the valve disc 67 in co-planar alignment with the wafer 53 inasmuch as the return of the wafer into the chamber 32 has brought the splined socket 76 into splined connection with the spline shaft 48 of the operator 46 thereby holding the disc 67 of wafer 53 in closed position pending the closure plate 39 being reapplied to the endless flange 37 of the valve body and the cap screws 38 inserted in place to reassemble butterfly valve 16 in its full normal operative condition.

The employment of the butterfly valve 16 and accessory device 17 and the tapping machine 79 to form a tapping operation on a water main 108 is illustrated in FIG. 6. In preparation for this operation, the inflow tube 19 of the butterfly valve 16 is connected by its flange 23 with a flange 109 on a tapping sleeve 110 which is clamped upon water main 108 while water under high pressure is flowing through said main. The tapping machine 79 may now be connected to the flange 24 on outflow tube 20 of valve body 18 as shown in FIG. 6 in readiness, when the wafer 53 has been withdrawn from the valve chamber 32, to extend a tubular core cutting saw 111 through the valve 16 and into contact with the water main 108 so as to cut a coupon from said main causing water to flow therefrom into the butterfly valve 16.

Before this coupon cutting operation may be performed, however, accessory device 17 must be assembled on the valve body 18 as shown in FIG. 6 and the hand wheel 101 turned to withdraw the wafer 53 from the valve chamber 32 so that the interior of valve 16 is entirely free to allow the core cutting saw 111 to be extended through said valve to perform a tapping operation on the water main 108. The ability of the invention to perform this water main tapping operation without shutting down the water main is due to the fact that the accessory device 17 provides a water tight extension of the valve chamber 32 into which the wafer 53 is withdrawn from said chamber before the tapping operation starts.

When the tapping machine has completed the cutting of the coupon from the water main 108, said machine is operated to withdraw the core cutting saw 111 with the coupon so that both are retracted from the chamber 32 of butterfly valve 16 thereby leaving this chamber open for the return of valve wafer 53 into said chamber by the reverse of the above described operation of the accessory device 17. As before noted, this return of the wafer 53 into the valve chamber 32 reconnects the spline socket 76 with the splined output shaft 48 of the valve operator 46 with the disc 67 in shut-off position so that the hexagonal key 81 may be removed from the hex shaped recess 70 in the flanged head 62 of the wafer neck 61 following which the flat closure plate 39 of the butterfly valve 16 is returned to covering relation with the valve chamber side opening 36 as shown in FIGS. 1, 2, 3, 4 and 5.

The tapping machine 79 may now be removed from the outflow tube 20 of the valve and a lateral service pipe 80 substituted therefor as shown in FIG. 12. It is to be noted in this view that butterfly valve 16 has now finished its service of facilitating the tapping of water main 108 and establishing a lateral service connection from said main to service pipe 80 in which the butterfly valve, reduced to its ultimate streamlined form, now performs the function of a service shut off valve.

Referring to FIGS. 4 and 7, upper and lower screw plugged vertically aligned holes 112 and 113 are provided in boss 40 which give access from above and below to recess 45 when this is desired. Hole 113 may be opened, incidental to the reassembly of wafer 53 in valve chamber 32, to prevent water trapped in recess 45 from impeding said reassembly, and to allow said water to drain from recess 45 by gravity. Hole 112 may be opened to admit air into recess 45 to facilitate said drainage and, after hole 113 is closed, for the introduction of a lubricant into recess 45, following which hole 112 is of course, plugged again.

The draincock 97 is provided in barrel 84 to drain the latter incidental to disassembling accessory devices 17 or 17a after the latter have been employed as above described.

I claim:

1. A butterfly valve main-tapping apparatus comprising:

a valve body including short co-axial in-flow and outflow tubes having flange connecting means at their outer ends and a central box enclosing a transversely disposed slot-like chamber which intercepts the bores of said tubes in spaced flat planes and opens radially at one side of said box;

a removeable plate for closing said side opening;

an annular wafer snugly slideably fitting within said chamber when inserted through said box side opening and having a bore connecting said tube bores;

a butterfly disc fitting snugly within said wafer bore and pivotally mounted on diametrally aligned trunnions A and B which journal in bearings provided in said wafer, the bearing for trunnion A forming a radial neck on said wafer which terminates within said cover plate for the said opening of said chamber;

means adapted to replace said cover plate to provide a water tight radial extension of said chamber;

means operating radially through said chamber extension means to engage said wafer neck and withdraw said wafer from its normal position of intercepting said tube bores, said means, when reversed, operating to replace said wafer in said normal position; and means operating through one of said disc trunnions for manually controlling the pivotal rotation of said disc about said trunnions when said wafer is in said normal position in said chamber and enclosed therein by said cover plate.

2. A valve apparatus as recited in claim 1 wherein said disc operating means is mounted on a portion of said box which is radially oppositely disposed from said chamber opening and functions through a connection with trunnion B to operate said disc.

3. An apparatus as recited in claim 2 wherein said connection comprises a spline means co-axially radially aligned with trunnion B and automatically disengaged by withdrawal of said wafer radially from said chamber and re-engaged by the return of said wafer into said chamber.

4. A valve apparatus as recited in claim 1 wherein said chamber and said wafer are wedge shaped whereby said wafer becomes wedged into a snugly sealed relation with said chamber when fully inserted therein, while, in other positions, said wafer slides freely in said chamber; and wherein said box has a semi-circular wall forming the back side of said chamber and two parallel narrow walls which are tangent and integral with said semicircular wall and terminate at the plane of said chamber side opening to form a radial throat through which said wafer is introduced into and removed from said chamber; and wherein said wafer withdrawal and replacement means comprises a radial plunger shaft adapted to be connected to said wafer neck and extending outwardly radially through a sealed opening in said water tight chamber extension means; and power means for pulling and pushing on said shaft to withdraw said wafer from and return it to its operative position in said chamber, without permitting the escape of water from said valve, and concluding with said wafer installed in said valve with said valve disc in shut position thereby permitting the substitution of said valve cover plate for said chamber extension means, without water escaping from said valve and without interrupting water service flowing through said valve.

5. A valve apparatus as recited in claim 4 wherein said semi-circular wall of said valve body box has a boss formed coaxially with said chamber throat and having a recess for receiving a splined socket provided on the outer end of trunnion B; and wherein said disc operating means is mounted on said boss and includes a splined shaft extending axially into said recess and co-axially aligned with said spline socket so as to be received therein when said wafer is inserted into its operative position in said chamber.

6. A valve apparatus as recited in claim 1 wherein slide gate means is provided to be assembled in spacing relation between the valve body and said valve body chamber extension means whereby said wafer may be withdrawn from said valve through said slide gate means while said valve is in service, and said slide gate means then shut off and said extension means disassembled, thus making said wafer accessible for servicing the same, following which, the valve chamber extension means may be reassembled with said slide gate means and the latter opened permitting said wafer to be returned through said slide gate means to the normal operating position of said wafer in said valve chamber, whereupon said slide gate means and said valve chamber extension means may be disassembled and replaced by said cover plate thus restoring said valve to its normal streamlined operating condition without interrupting the water service being delivered therethrough.

7. A valve apparatus as recited in claim 1 wherein means is provided for locking said valve disc in shut position while withdrawing said wafer from said valve chamber and while returning said wafer into said chamber.

8. A valve apparatus as recited in claim 7 wherein said disc locking means is located in said wafer neck inside said cover plate and includes a recess formed in said neck and a key means which is disposable in said recess while said cover plate is removed to lock trunion A to said wafer neck with said valve disc in shut position;

said key means being removable from said recess, whereby the valve disc is unlocked to permit the normal functioning of said valve, when said cover plate is replaced.

* * * * *